United States Patent
Snyder et al.

(10) Patent No.: US 11,863,062 B2
(45) Date of Patent: Jan. 2, 2024

(54) CAPACITOR DISCHARGE CIRCUIT

(71) Applicant: Raytheon Company, Waltham, MA (US)

(72) Inventors: Benjamin J. Snyder, Boxborough, MA (US); Erin K. Nolan, Bolton, MA (US); Aline Elad, Ayer, MA (US); John D. Walker, Bolton, MA (US)

(73) Assignee: Raytheon Company, Waltham, MA (US)

( * ) Notice: Subject to any disclaimer, the term of this patent is extended or adjusted under 35 U.S.C. 154(b) by 634 days.

(21) Appl. No.: 15/965,070

(22) Filed: Apr. 27, 2018

(65) Prior Publication Data

US 2019/0334363 A1    Oct. 31, 2019

(51) Int. Cl.
*H02J 7/00* (2006.01)
*H02M 1/32* (2007.01)
*H02J 7/34* (2006.01)

(52) U.S. Cl.
CPC .............. *H02M 1/32* (2013.01); *H02J 7/345* (2013.01)

(58) Field of Classification Search
CPC ................. H01M 3/158; H01M 3/156; H02M 2001/0006; H02J 7/007
See application file for complete search history.

(56) References Cited

U.S. PATENT DOCUMENTS

| | | | | |
|---|---|---|---|---|
| 3,633,046 A | * | 1/1972 | Dewey | H02M 1/088 |
| | | | | 327/460 |
| 3,805,143 A | * | 4/1974 | Tauern | B23K 9/1081 |
| | | | | 363/88 |
| 4,031,452 A | * | 6/1977 | Longa | H02M 3/3376 |
| | | | | 363/52 |
| 4,243,918 A | * | 1/1981 | Meise | G06G 7/184 |
| | | | | 315/389 |
| 4,449,177 A | * | 5/1984 | Kozai | H02M 1/00 |
| | | | | 363/126 |
| 4,459,489 A | * | 7/1984 | Kirk | H02J 7/24 |
| | | | | 290/13 |

(Continued)

FOREIGN PATENT DOCUMENTS

CN    200986575 Y    * 12/2007
CN    102593812       7/2012
(Continued)

OTHER PUBLICATIONS

Notification of Transmittal of the International Search Report and the Written Opinion of the ISA dated Jun. 28, 2019 for International Application No. PCT/US2019/024005; 1 Page.

(Continued)

*Primary Examiner* — Drew A Dunn
*Assistant Examiner* — Pamela J Jeppson
(74) *Attorney, Agent, or Firm* — DALY CROWLEY MOFFORD & DURKEE, LLP

(57) ABSTRACT

A capacitor discharge circuit for discharging a capacitor to a discharge load. The discharge circuity includes current level sensing circuitry for producing a control signal circuity response to current passing to the discharge load. The discharge circuity modulates a level of current passing from the capacitor to the discharge load over time between predetermined ranges of current levels in response to the control signal.

20 Claims, 7 Drawing Sheets

(56) References Cited

U.S. PATENT DOCUMENTS

| | | | | | |
|---|---|---|---|---|---|
| 4,567,424 A | * | 1/1986 | Dobsa | ............... | H02J 3/1864 323/210 |
| 4,683,529 A | * | 7/1987 | Bucher, II | ............... | H02M 1/44 363/44 |
| 4,727,308 A | * | 2/1988 | Huljak | ............... | H02M 3/1588 323/222 |
| 4,760,324 A | * | 7/1988 | Underhill | ............... | H02M 3/1563 323/282 |
| 4,816,741 A | * | 3/1989 | Ekstrand | ............... | G05F 1/648 323/233 |
| 5,157,321 A | * | 10/1992 | Kato | ............... | H02J 7/2434 322/28 |
| 5,361,247 A | * | 11/1994 | Fuji | ............... | G11B 7/005 369/124.11 |
| 5,365,150 A | * | 11/1994 | Shiomi | ............... | H02M 7/53871 315/209 R |
| 5,384,553 A | * | 1/1995 | Takeda | ............... | H03B 5/26 331/108 C |
| 5,433,184 A | * | 7/1995 | Kinoshita | ............... | F02P 15/08 123/406.57 |
| 5,446,365 A | * | 8/1995 | Nomura | ............... | B60L 7/12 320/128 |
| 5,469,046 A | * | 11/1995 | Wong | ............... | H02M 7/2176 323/286 |
| 5,523,665 A | * | 6/1996 | Deaver | ............... | H02H 3/023 320/135 |
| 5,559,404 A | * | 9/1996 | MacDougall | ............... | H03K 5/12 315/209 CD |
| 5,587,894 A | * | 12/1996 | Naruo | ............... | H02M 3/07 363/84 |
| 5,608,614 A | * | 3/1997 | Ohnishi | ............... | H02M 1/4208 363/60 |
| 5,610,807 A | * | 3/1997 | Kanda | ............... | H02M 7/497 363/43 |
| 5,619,076 A | * | 4/1997 | Layden | ............... | H01R 13/7035 307/48 |
| 5,666,257 A | * | 9/1997 | Yang | ............... | H01H 33/596 361/139 |
| 5,751,140 A | * | 5/1998 | Canter | ............... | G05F 1/56 323/282 |
| 5,757,214 A | * | 5/1998 | Stoddard | ............... | H02H 7/0844 327/427 |
| 5,856,739 A | * | 1/1999 | Trica | ............... | H02M 1/36 323/222 |
| 6,066,936 A | * | 5/2000 | Okamura | ............... | H02J 7/345 320/104 |
| 6,087,811 A | * | 7/2000 | Crawford | ............... | H05B 41/34 320/139 |
| 6,304,066 B1 | * | 10/2001 | Wilcox | ............... | H02M 3/1588 323/282 |
| 6,424,125 B1 | * | 7/2002 | Graham | ............... | H02H 3/14 320/166 |
| 6,531,689 B2 | * | 3/2003 | Ohishi | ............... | G03G 15/2003 219/619 |
| 6,664,772 B2 | * | 12/2003 | Saeki | ............... | H02M 1/36 323/273 |
| 7,200,015 B1 | * | 4/2007 | Mirskiy | ............... | H02M 1/36 363/47 |
| 7,268,526 B1 | * | 9/2007 | Smith | ............... | H02M 3/156 323/284 |
| 9,041,371 B2 | * | 5/2015 | Gotoh | ............... | H02M 3/156 323/282 |
| 9,106,133 B2 | * | 8/2015 | Gilliom | ............... | H02M 3/33561 |
| 9,160,227 B2 | * | 10/2015 | Chen | ............... | H02M 1/4225 |
| 9,306,386 B2 | * | 4/2016 | Kuznetsov | ............... | H02H 9/02 |
| 9,559,527 B2 | * | 1/2017 | Jeong | ............... | H02J 3/00 |
| 10,009,021 B1 | * | 6/2018 | Buzzetti | ............... | H03K 17/693 |
| 2002/0003820 A1 | * | 1/2002 | Yoshida | ............... | H03K 3/57 372/38.1 |
| 2002/0030411 A1 | * | 3/2002 | Curtis | ............... | H02M 7/53832 307/64 |
| 2002/0093293 A1 | * | 7/2002 | Mayama | ............... | H05B 39/047 315/224 |
| 2003/0141857 A1 | * | 7/2003 | Nishida | ............... | H02M 3/156 323/282 |
| 2003/0187485 A1 | * | 10/2003 | Sturman | ............... | H02J 7/0063 607/72 |
| 2003/0193770 A1 | * | 10/2003 | Chung | ............... | H01H 9/542 361/118 |
| 2003/0210025 A1 | * | 11/2003 | Ishii | ............... | H02M 3/158 323/284 |
| 2005/0168195 A1 | * | 8/2005 | MacDougall | ............... | H03K 3/53 320/166 |
| 2006/0017481 A1 | * | 1/2006 | Yoshikawa | ............... | H02M 7/527 327/170 |
| 2006/0044853 A1 | * | 3/2006 | Oswald | ............... | H02M 3/1588 363/72 |
| 2006/0071639 A1 | * | 4/2006 | Ross | ............... | H02J 7/0063 320/116 |
| 2006/0220631 A1 | * | 10/2006 | Ito | ............... | H02M 3/157 323/283 |
| 2007/0024259 A1 | * | 2/2007 | Ball | ............... | H02M 3/156 323/283 |
| 2007/0076338 A1 | * | 4/2007 | Traynor | ............... | H01L 27/0285 361/56 |
| 2007/0279025 A1 | * | 12/2007 | Xu | ............... | H02M 3/1588 323/282 |
| 2008/0170720 A1 | * | 7/2008 | Rashid | ............... | H03G 3/348 381/94.5 |
| 2008/0203981 A1 | * | 8/2008 | Itoh | ............... | H01L 23/5228 323/263 |
| 2008/0238388 A1 | * | 10/2008 | Sato | ............... | H02M 3/158 323/282 |
| 2009/0033294 A1 | * | 2/2009 | Odajima | ............... | H02J 7/0029 320/166 |
| 2009/0167260 A1 | * | 7/2009 | Pauritsch | ............... | H05B 45/375 323/233 |
| 2010/0102782 A1 | * | 4/2010 | Thiesen | ............... | H02N 2/181 320/166 |
| 2010/0148732 A1 | * | 6/2010 | Lynch | ............... | H02J 7/345 320/166 |
| 2010/0270986 A1 | * | 10/2010 | Alimenti | ............... | H02M 3/1582 323/282 |
| 2011/0025278 A1 | * | 2/2011 | Balakrishnan | ............... | H02M 1/32 320/166 |
| 2011/0057627 A1 | * | 3/2011 | Kuehner | ............... | H02H 3/14 320/166 |
| 2011/0176343 A1 | * | 7/2011 | Kojima | ............... | B60L 3/00 363/132 |
| 2011/0280053 A1 | * | 11/2011 | Halberstadt | ............... | H02M 3/155 363/126 |
| 2012/0026761 A1 | * | 2/2012 | Young | ............... | H05B 45/50 363/44 |
| 2012/0051757 A1 | * | 3/2012 | Nishino | ............... | H05B 47/19 398/201 |
| 2012/0112638 A1 | * | 5/2012 | Melanson | ............... | H05B 45/3725 315/117 |
| 2012/0126766 A1 | * | 5/2012 | Chen | ............... | H02M 3/156 323/283 |
| 2012/0162839 A1 | * | 6/2012 | Wiederhold | ............... | G01R 31/386 361/65 |
| 2012/0235659 A1 | * | 9/2012 | Wen | ............... | H02M 3/156 323/282 |
| 2012/0293256 A1 | * | 11/2012 | Asao | ............... | H03F 3/217 330/251 |
| 2012/0294056 A1 | * | 11/2012 | Temesi | ............... | H03K 17/08128 363/131 |
| 2013/0002209 A1 | * | 1/2013 | Voegele | ............... | H02M 1/32 320/166 |
| 2013/0003428 A1 | * | 1/2013 | Meng | ............... | H03K 17/302 363/49 |
| 2013/0147440 A1 | * | 6/2013 | Shiroyama | ............... | H02M 7/217 320/166 |
| 2013/0188401 A1 | * | 7/2013 | Jin | ............... | H02M 1/4225 363/21.17 |
| 2013/0334818 A1 | * | 12/2013 | Mashal | ............... | H02P 9/107 290/44 |

(56) References Cited

U.S. PATENT DOCUMENTS

| | | | | |
|---|---|---|---|---|
| 2014/0036561 | A1* | 2/2014 | Sakurai | H02M 7/217 363/126 |
| 2014/0063593 | A1* | 3/2014 | Berendt | H01S 5/0428 359/341.1 |
| 2014/0091324 | A1* | 4/2014 | Zushi | H01L 27/0682 257/77 |
| 2014/0111113 | A1* | 4/2014 | Del Carmen, Jr. | H02M 3/158 315/297 |
| 2014/0145693 | A1* | 5/2014 | Lee | H02M 3/156 323/271 |
| 2014/0159692 | A1* | 6/2014 | Tzinker | H05B 45/10 323/284 |
| 2014/0210443 | A1* | 7/2014 | Liu | H02M 3/158 323/282 |
| 2015/0009728 | A1* | 1/2015 | Sugita | H05B 45/385 363/45 |
| 2015/0036401 | A1* | 2/2015 | Murakami | H02M 1/4208 363/126 |
| 2015/0222173 | A1* | 8/2015 | Malinin | H02M 1/08 363/21.16 |
| 2015/0280566 | A1* | 10/2015 | Chang | H05B 45/37 323/271 |
| 2015/0333619 | A1* | 11/2015 | Leske | G01R 27/02 702/65 |
| 2015/0357899 | A1* | 12/2015 | Ekbote | H02M 7/217 315/224 |
| 2015/0357908 | A1* | 12/2015 | Ekbote | H05B 45/37 315/201 |
| 2016/0004354 | A1* | 1/2016 | Kremin | H03M 11/02 345/174 |
| 2016/0065061 | A1* | 3/2016 | Tsyrganovich | H02M 3/156 323/312 |
| 2016/0065209 | A1* | 3/2016 | Shen | H03K 17/725 327/453 |
| 2016/0233688 | A1* | 8/2016 | Ker | G05F 1/46 |
| 2016/0241135 | A1 | 8/2016 | Zhao et al. | |
| 2017/0048943 | A1* | 2/2017 | Zhang | H05B 45/37 |
| 2017/0077730 | A1* | 3/2017 | Berg | H02J 7/0063 |
| 2017/0155377 | A1* | 6/2017 | Hu | H03K 17/163 |
| 2017/0170721 | A9* | 6/2017 | Kim | H02M 3/07 |
| 2017/0188420 | A1* | 6/2017 | Kido | H04B 10/502 |
| 2017/0288558 | A1* | 10/2017 | Perchlik | H02M 3/33592 |
| 2017/0355267 | A1* | 12/2017 | Zhou | H02M 7/537 |
| 2017/0366084 | A1* | 12/2017 | Tsyrganovich | H02M 3/156 |
| 2018/0123485 | A1* | 5/2018 | Rastegar | F42C 11/02 |
| 2018/0152041 | A1* | 5/2018 | Onishi | H01M 10/44 |

FOREIGN PATENT DOCUMENTS

| | | |
|---|---|---|
| CN | 106533141 A | 3/2017 |
| TW | 201419730 A | 5/2014 |
| WO | WO 2006/039478 A2 | 4/2006 |

OTHER PUBLICATIONS

International Search Report dated Jun. 28, 2019 for International Application No. PCT/US2019/024005; 4 Pages.

Written Opinion of the ISA dated Jun. 28, 2019 for International Application No. PCT/US2019/024005; 10 Pages.

Taiwan Decision of Rejection in Primary Examination with English Translation dated Nov. 26, 2020, for Taiwan Patent Application No. 108112111, 7 pages.

Taiwan Office Action with English Translation dated Jun. 16, 2020, for Taiwan Patent Application No. 108112111, 11 pages.

Taiwanese Office Action with English Translation dated Apr. 14, 2021 for Taiwan Application No. 108112111; 5 Pages.

International Preliminary Report on Patentability dated Nov. 5, 2020 for International Application No. PCT/US2019/024005; 10 Pages.

Response (with Machine English Translation) to Taiwan Office Action dated Apr. 14, 2021 for Taiwan Application No. 108112111; Response Filed Oct. 14, 2021; 13 Pages.

Taiwan Allowance Decision (with Machine English Translation) dated Oct. 21, 2021 for Taiwan Application No. 108112111; 3 Pages.

* cited by examiner

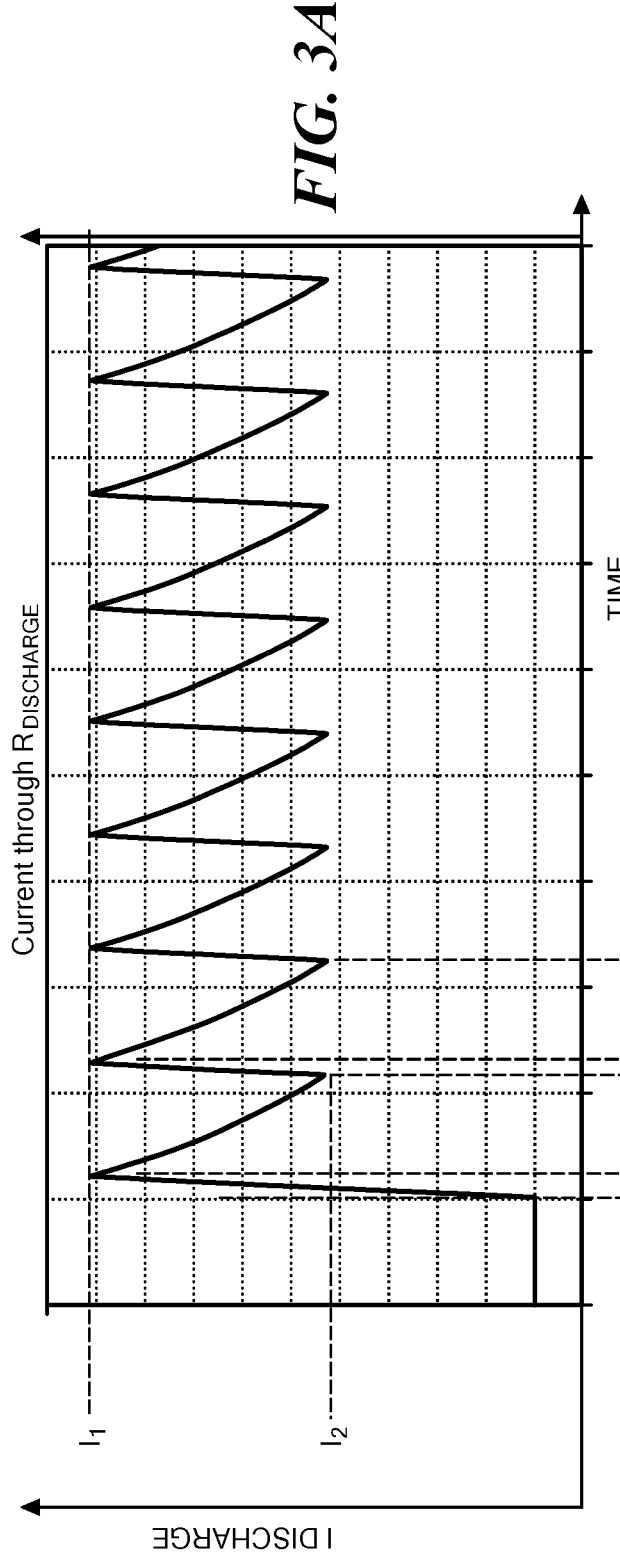
*FIG. 3A*
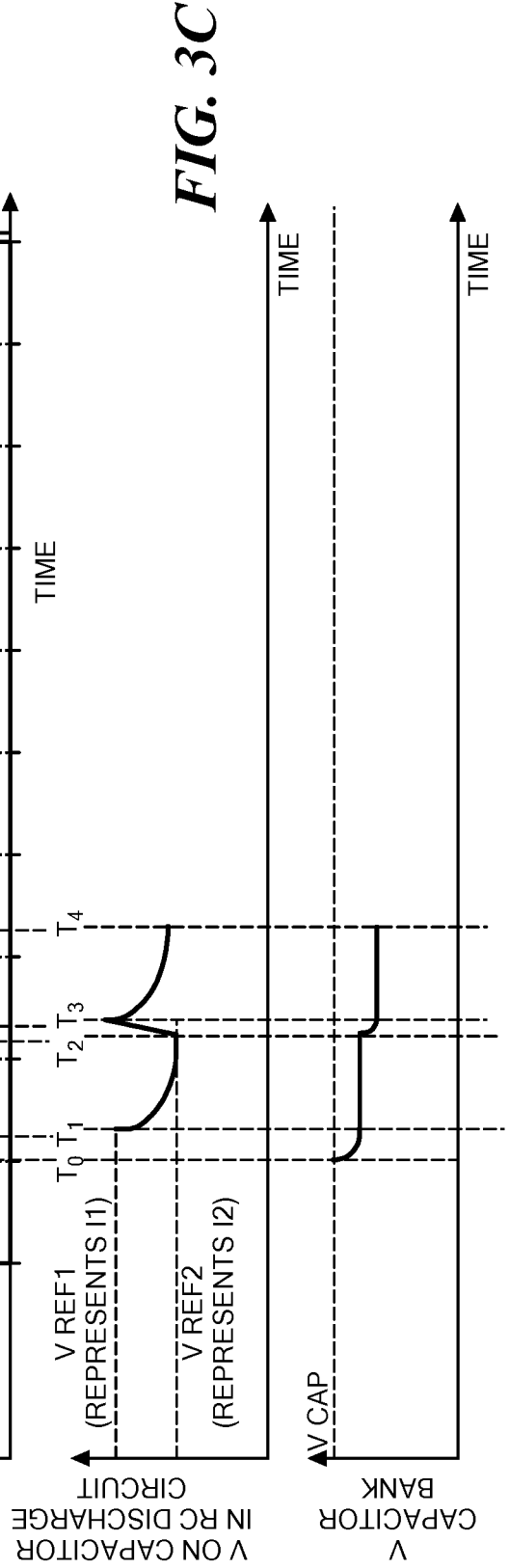
*FIG. 3C*
*FIG. 3D*

CAPACITOR DISCHARGE CIRCUIT

TECHNICAL FIELD

This disclosure relates generally to capacitor discharge circuits and more particularly, to capacitor discharge circuits for dissipating a constant amount of energy stored in the capacitor during the discharge of the capacitor.

BACKGROUND

As is known in the art, many applications require the discharge of capacitors storing relatively high voltages, for example greater than thirty volts, and as high as 90 volts or more in less than a few seconds. One techniques used to discharge capacitors is to couple the capacitor to a high energy rated resistor that is switched across the capacitor in response to a control signal applied when the discharge is required. However, such an arrangement results in a very large instantaneous peak power dissipation that rolls off as the voltage reduces as a function of the RC time constant requiring the resistor to operate continuously with high power and limit restart cycles in order to provide sufficient cooling time for the resistor. More particularly, the resistors thin the stored energy into heat causing the surrounding temperature to rise. Power cannot be reapplied until the resistors and surrounding circuitry has sufficiently cooled. The discharge resistors are also subject to overheating and destruction if main power is still applied while the discharge circuit is active. Lastly, the power dissipated by the resistor is non-linear, that is as the voltage across the energy storage elements decays, the power dissipated rolls off as a function of the decreasing voltage squared, which causes the resistor to be sized much larger than it would otherwise be if the power were linearly dissipated over the discharge time.

Other capacitor discharge circuits are suggested in Chinese Patents CN 102593812A and CN202495761U, such circuits being constant power discharge circuits using pulse width modulation to create a constant voltage across a discharge resistor.

SUMMARY

In accordance with the disclosure, a capacitor discharge circuit is provided having: a capacitor; a discharge load; a controller, responsive to a control signal, for coupling the discharge load to the capacitor in response to a discharge command signal; and discharge circuity, comprising current level sensing circuitry for producing a control signal in response to current passing to the discharge load, the discharge circuity modulating a level of current passing from the capacitor to the discharge load over time between predetermined ranges of current levels in response to the control signal.

In one embodiment the discharge circuity comprises current level sensing circuitry for producing a control signal circuity in response to current passing to the discharge load, the discharge circuity discharging the capacitor to the discharge load over a plurality of discharge cycles with current from the capacitor passing through the discharge load with increasing in level over time during one portion of each one of the discharge cycles and with current passing through the discharge load decreasing in level over time during a different portion of each one of the discharge cycles in response to the control signal.

In one embodiment, the discharge circuitry includes an inductor in series with both the capacitor and discharge load, wherein: during said one portion of each one of the discharge cycles, the inductor stores a portion of energy discharged from the capacitor while a different portion of the energy discharged is dissipated in the discharge load; and during said different portion of each one of the discharge cycles the portion of the energy discharged stored in the inductor is dissipated in the discharge load.

In one embodiment, the discharge circuity comprises: current level sensing circuitry for sensing the level of the current passing to the discharge load during said one portion of each one of the discharge cycles; and a controller for initiating switching from said one portion of each one of the discharge cycles to said different one of the discharge cycles when the level of the sensed current passing through a predetermined current level.

In one embodiment, the discharge circuity includes timing circuity for switching from said one portion of each one of the discharge cycles to said different one of each one of the discharge cycles a predetermined period of time after the initiating switching from said one portion of each one of the discharge cycles to said different one of the discharge cycles.

In one embodiment, the current level sensing circuitry produces a voltage level varying in accordance with the level of current passing through the discharge load during said one portion of each one of the discharge cycles and wherein the discharge circuity comprises: a voltage sampler, responsive to current level sensing circuitry, for storing a sample of the level of the produced voltage level when such produced voltage level reaches a predetermined voltage level; a resistor-capacitor network fed by the sampler, the capacitor of the resistor-capacitor network storing the sample of the produced voltage level and then discharging the stored voltage through the resistor of such resistor-capacitor network; and circuitry for initiating said different portion of each one of the discharge cycles when the voltage discharges to a second predetermined voltage level;

In one embodiment, a capacitor discharge circuit is provided, comprising: a capacitor connected having a first plate and a second plate for storing an electric charge; and discharge circuitry connected between the first plate and the second plate. The discharge circuitry, comprising: a discharge section having one terminal connected to the first plate. The discharge section comprising: discharge load; an inductor serially connected to the discharge load; a diode connected in parallel with the serially connected discharge load and the inductor; a switch; and current level sensing circuitry. The discharge section, switch, and current level sensing circuitry are serially connected the first plate and the second plate. A controller, responsive to a control signal, enables the electric charge to become discharged from such capacitor and dissipated in the discharge load. In response to the control signal, a first one of a plurality of discharge cycles is initiated. During a first phase of the plurality of discharge cycles: the switch is closed electrically coupling the discharge section to the second plate with current passing from the first plate through discharge load, through the inductor, through the closed switch and through the current level sensing circuitry with such current producing a voltage to reverse bias the diode, a portion of energy in such current being dissipated in the discharge load and another portion of such energy such current being stored in a magnetic field of the inductor until the current reaches a predetermined level sensed by the current level sensing circuitry to initiate a second phase of the plurality of discharge cycles; and during a second phase of the plurality of discharge cycle: the switch is open electrically interrupting current from passing from the first plate through the inductor with such interrupted current resulting in the inductor producing a voltage to forward bias the diode and enable the energy stored in the magnetic field of the inductor to pass to the discharge load and dissipate in the discharge load and, subsequent to such discharge, initiate a subsequent one of the plurality of discharge cycles.

With such an arrangement, a capacitor discharge circuit is provided which enables constant dissipation of the energy stored in a capacitor bank and thereby allows for the use of smaller dissipation resistors, reapplication of main input power at any time after discharge; and can be operated indefinitely if a failure of the discharge circuit or power system occurs that causes the discharge circuit to be active while main system power is still applied to the capacitor bank. The constant power discharge is achieved by the creation of an average current through the discharge resistors by use of an inductor and freewheeling flyback diode. Control of the discharge circuit current can be achieved by a plurality of methods such as matching the RC time constant of a comparator monitoring circuit to the L/R time constant of the discharge circuit, and turning a FET switch on and off at the appropriate time. The circuit is self-powered from the voltage of the capacitor bank that is being discharged so external power is not required for operation.

The constant discharge is achieved by turning the FET switch "on" when the current through the inductor reaches the lower peak, and turning the FET "off" when the current reaches the high peak. That switching of the FET "on" and "off" creates a triangular waveform of current through the inductor and discharge resistor, which results in a constant (average) power dissipation in the resistors.

Thus, the disclosure provides for the constant dissipation of the energy stored in a capacitor, which allows for the use of smaller dissipation resistors, reapplication of main input power at any time after discharge; and, can be operated indefinitely if a failure of the discharge circuit or power system occurs that causes the discharge circuit to be active while main system power is still applied to the capacitor bank. The constant power discharge is achieved by the creation of an average current through the discharge resistors by use of an inductor and freewheeling flyback diode. The circuit is self-powered from the voltage of the capacitor bank that is being discharged so external power is not required for operation. The circuit greatly reduces the physical size and energy rating of the energy dissipating elements (resistors), provides a failsafe control in the event an active discharge command while the power was applied, is more reliable, and is scalable to large system level designs.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3A is a timing diagram of discharge current through a discharge resistor $R_{DISCHARGE}$ used in the system of FIG. 1 during a portion of the operation of the capacitor discharge circuit of FIG. 1;

FIG. 3C is a timing diagram of a voltage on a capacitor used in an RC circuit used in the system of FIG. 1 during a portion of the operation of the capacitor discharge circuit of FIG. 1;

FIG. 3D is a timing diagram of a voltage on the capacitor bank being discharged in the system of FIG. 1 during a portion of the operation of the capacitor discharge circuit of FIG. 1.

DETAILED DESCRIPTION

Figure 1:
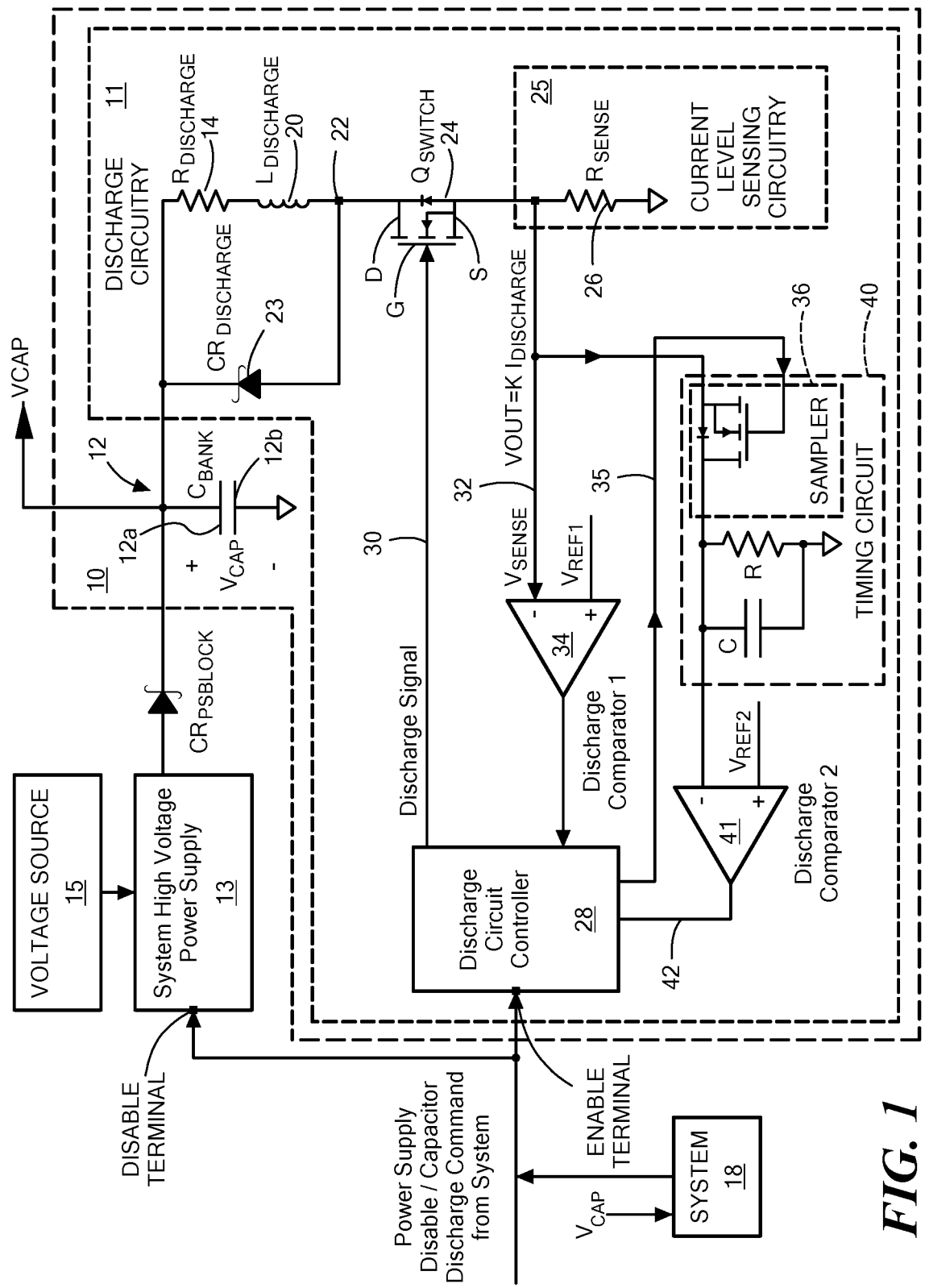
FIG. 1 is a block diagram of a system having a capacitor discharge circuit used to discharge a voltage on a capacitor bank of such system according to the disclosure.

Referring now to FIG. 1, a circuit 10 is shown having discharge circuitry 11 for discharging a capacitor bank 12, coupled to an output of a High Voltage Power Supply 13, to a discharge load 14, here a resistor $R_{DISCHARGE}$, here, for example, 2.5 ohms. The capacitor bank 12 provides a voltage, VCAP, for a system 18. The High VOLTAGE POWER Supply 13 is coupled to a voltage source 15. The voltage source 15 may be: an ac voltage source, in which case the High Voltage Power Supply 13 would, when enabled, produce a DC Voltage at output 17; or, a DC voltage, in which case the High Voltage Power Supply 13 would be a DC-DC converter to increase the DC voltage to a higher DC voltage at output 17. In either case, the DC voltage at output 17 is fed to the Capacitor bank 12 through a diode $CR_{PSBLOCK}$, as shown.

As will be described in more detail below, subsequent to High Voltage Power Supply being enabled and charge being stored on the capacitor bank 12, the discharge circuity 11 discharges such stored change during a plurality of two-phase discharge cycles. More particularly, the discharge circuity 11 is enabled and the charge built up on the capacitor 12 is discharged and thereby dissipated in the discharge load 14 over the plurality of the two-phase discharge cycles, with current from the capacitor bank 12 passing through the discharge load 14 with increasing level over time during one portion, or phase, of each one of the two-phase discharge cycles and with current passing through the discharge load 14 decreasing in level over time during a subsequent, different portion, or phase of each one of the two-phase discharge cycles. In this way, the energy (charge) stored on the capacitor bank 12 is discharged in small packets distributed over a long period of time.

More particularly, the capacitor bank 12 has one plate or electrode 12b connected to a reference potential, here ground, and the other plate, or electrode, 12a connected to one end of the discharge load 14, as shown. The other end of the discharge load 14 is connected to one end of an inductor $L_{DISCHARGE}$ 20, here, for example, 60 micro-henries, as shown; the other end of the inductor 20 being connected to a terminal 22, as shown. The terminal 22 is connected to: plate 12a of the capacitor bank 12 through a freewheeling, fly-back diode 23, as shown; and to the drain D of a Field Effect Transistor (FET) $Q_{SWITCH}$ 24, as shown. The source S of the FET 24 is coupled to ground through a current level sensing resistor $R_{SENSE}$ 26, as shown.

Figure 1A:
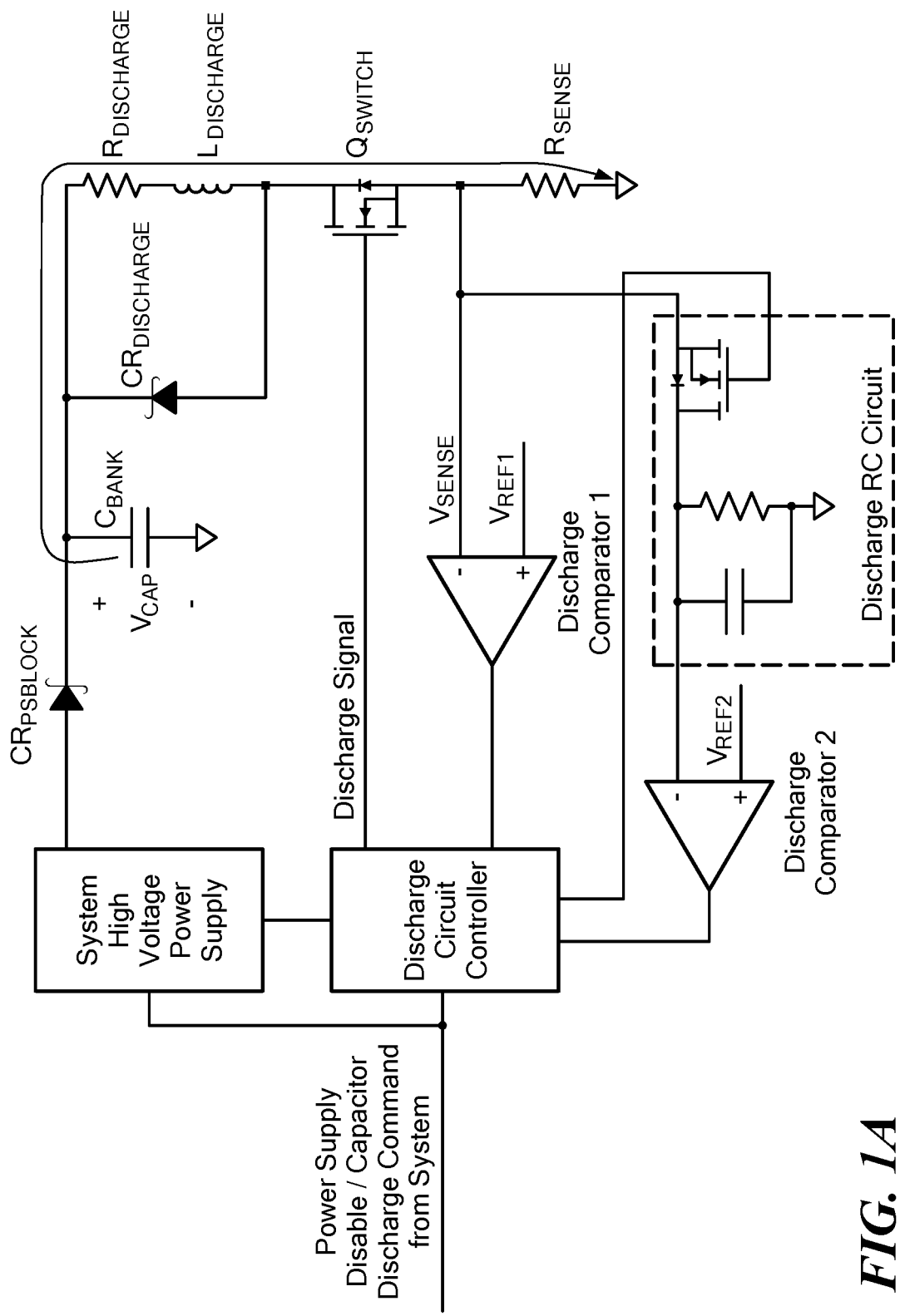
FIG. 1A is a block diagram of the system of FIG. 1 showing a path for discharge current during a first cycle of one of a plurality of two-phase successive two-phase discharge cycles performed by such capacitor discharge circuit of FIG. 1 according to the disclosure.

The Discharge circuitry 11 includes a discharge controller 28, as shown. In response to a power supply disable/capacitor bank discharge signal from system 18, to the disable terminal of power supply 13 and the enable terminals of controller 28, the voltage produced by the power supply 13 when previously enabled, is decoupled from output terminal 17 and the controller 28 changes a previous state of a signal on line 30 to the gate G of FET 24 from a signal that placed the FET 24 in a non-conducting condition when the power supply 13 was enabled to a state that places FET 24 in a conducting condition and thereby commences the first phase of the two-stage discharge cycle. When PET 24 conducts, charge on plate 12a of capacitor bank 12 passes as discharge current through discharge load 14, inductor 20, FET 24, current level sensing resistor 26 to ground, as shown in FIG. 1A, thereby initiating the first portion or phase of one of a plurality of two-phase discharge cycles. During this portion or phase of the cycle, the discharge current from the capacitor bank 12 passes through the discharge load 14, inductor 20 and sensing resistor 26 increase in level over time. The level of the discharge current from the capacitor bank 12 is sensed by current level sensing circuitry 25, here a sensing resistor 26 which produces a voltage ($V_{SENSE}$) on line 32 proportional to such sensed current level. When the voltage $V_{SENSE}$ reaches a predetermined voltage $V_{REF1}$ (such voltage $V_{REF1}$ being the voltage level when $V_{SENSE}$ corresponds to a current level I1 passing thorough R resistor 26 (which is the same current level passing through $R_{DISCHARGE}$ 14), here, for example, $V_{REF1}$ is 1.24 volts), the controller 28 produces the discharge signal on line 30 to place FET 24 in a non-conducting condition. It is noted that during this first portion or first phase of the discharge cycle: (1) While a portion of the energy produced from the discharge current passing from the from the capacitor bank 12 through the discharge load 14 was dissipated in the discharge load 14 another portion of the energy produced from the discharge current passing from the capacitor bank 12 through the discharge load 14 was stored in the magnetic field of inductor 20; (2) the voltage on the capacitor bank 12 was reduced; and (3), the controller 28 sends a sampling pulse on line 35 to sampler 36 of a timing circuit 40 and a capacitor C of the timing circuit 40 stores the sampled voltage $V_{SENSE}$.

Figure 1B:
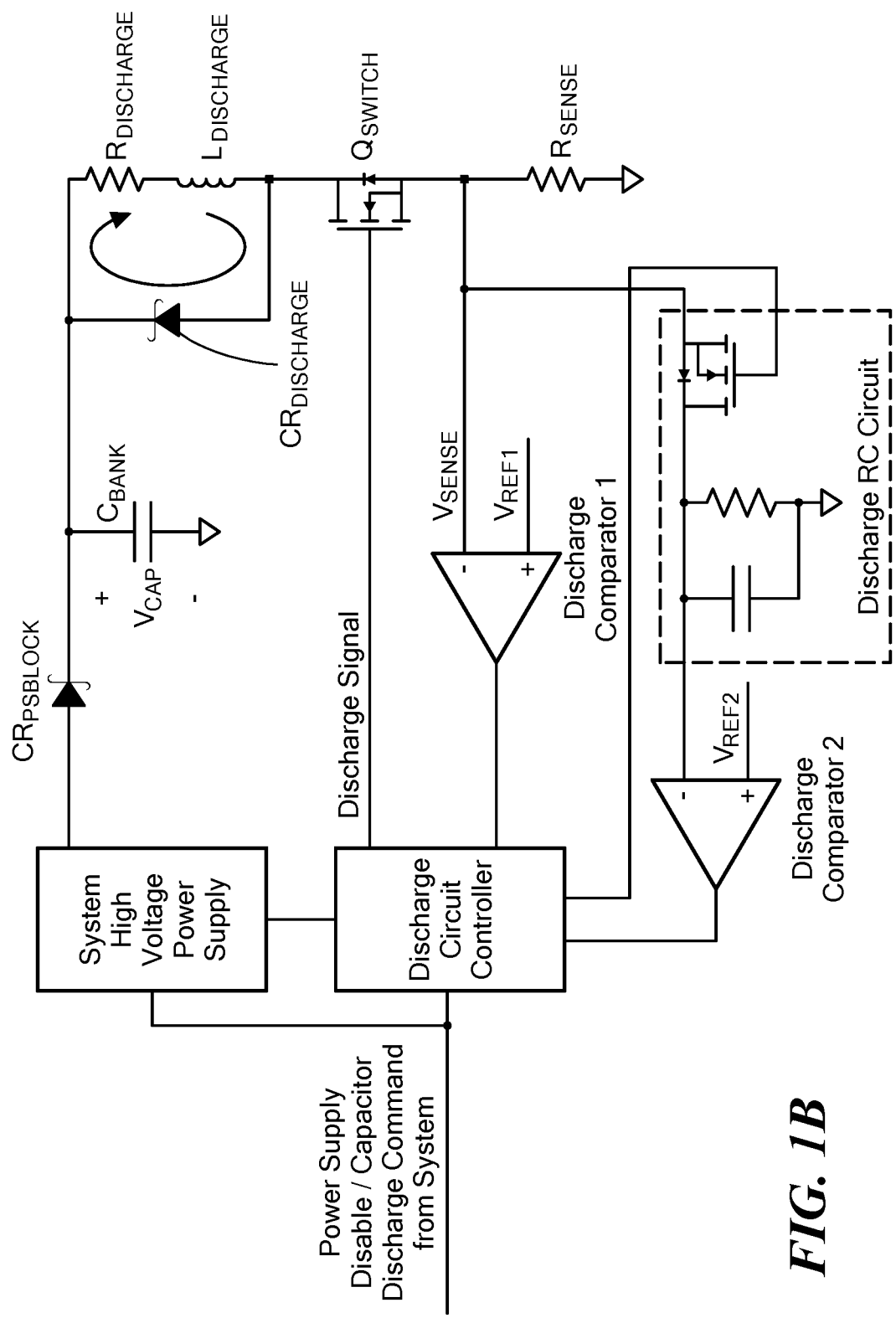
FIG. 1B is a block diagram of the system of FIG. 1 showing a path for discharge current during a second, subsequent cycle of the one of a plurality of two-phase successive two-phase discharge cycles performed by such capacitor discharge circuit of FIG. 1 according to the disclosure.

When the FET 24 is placed in the non-conducting state, the second portion or phase of the two-phase discharge cycle commences. Three things should be noted during this second portion or phase of the two-stage discharge cycle: (1) energy stored in the inductor 20 during the first portion or cycle of the two-phase discharge cycle, produced from the discharge current passing from the capacitor bank 12 through the discharge load 14, now produces a very high positive induced voltage, sometimes referred to as an inductive kick as a result of rapidly producing at open circuit when the FET 24 is placed in the non-conducting state. This very high positive induced voltage forward biases the diode 23 and the energy stored in the inductor 20 from the discharge current passing from the capacitor bank 12 now passes as current through diode 23 to the discharge load 14, as shown in FIG. 1B, for dissipation in such discharge load 14; and (2) the level of the current through the discharge load 14 decreases over time unlike the increasing level of current passing through the discharge load 14 during the first portion or phase of the two-phase discharge cycle; and (3) the timing circuit 40 sets the time duration of the second portion or phase of the two-phase discharge cycle since the voltage $V_{REF1}$ stored on capacitor C, here for example, 0.012 picofarards, discharges through a resistor R, here for example, 2 KOhms, of the timing circuit 40 and when such voltage on the capacitor C decreases to a predetermined level $V_{REF2}$, comparator 41 (the voltage $V_{REF2}$ being selected to corresponding to a time determined a priori to be when the level of the current passing though the discharge load 14 reaches a current level 12, here for example, $V_{REF2}$ is 0.62 volts) produces a voltage on line 42 to terminate the second portion or phase of the two-phase discharge cycle. More particularly, the controller 28 switches the state of the discharge signal on line 30 to again place the FET 24 in a conducting condition to commence the first portion or phase of the next two phase discharge cycle.

Figure 2:
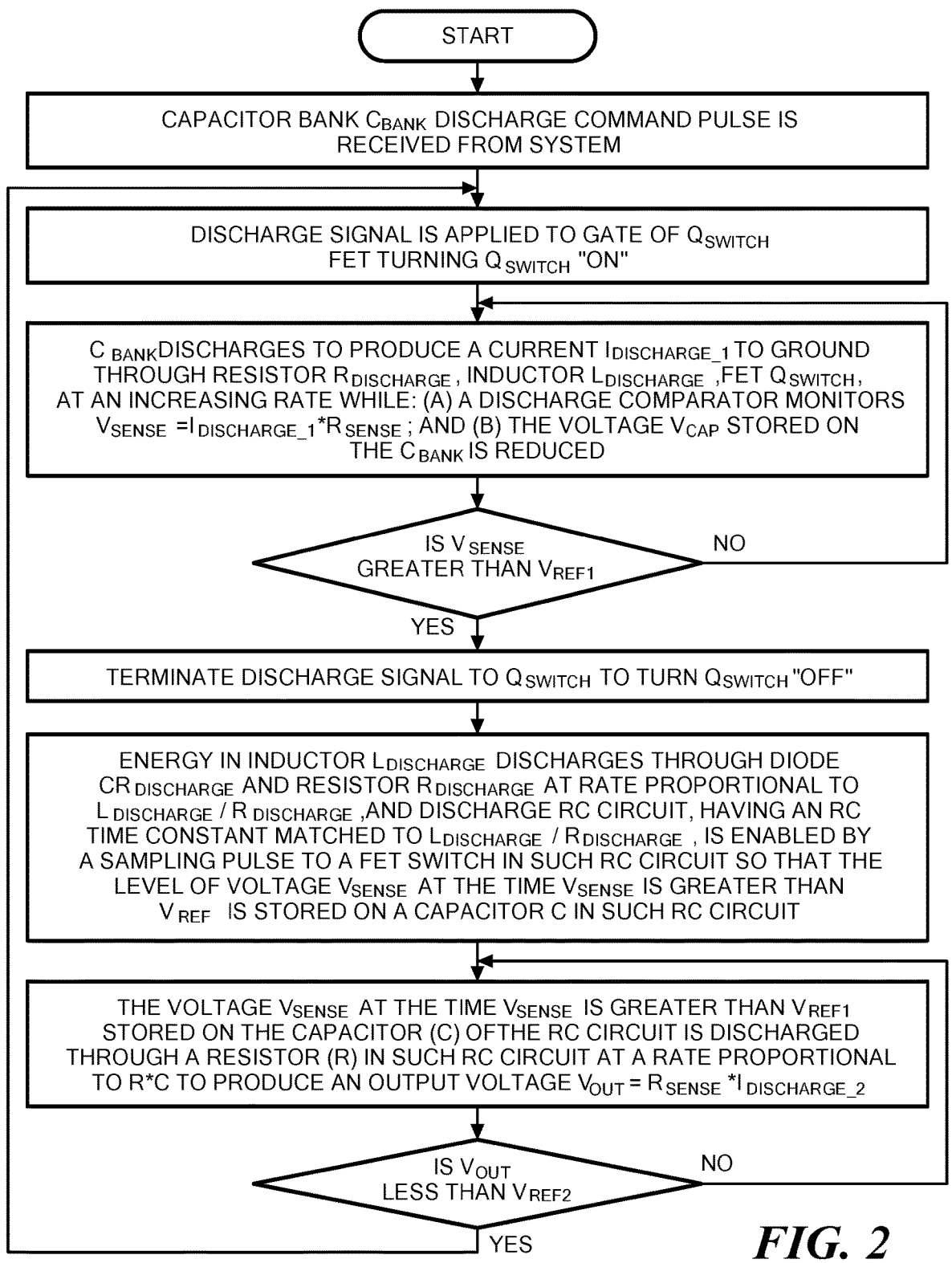
FIG. 2 is a flowchart of the operation of the capacitor discharge circuit of FIG. 1 according to the disclosure
Figure 3B:
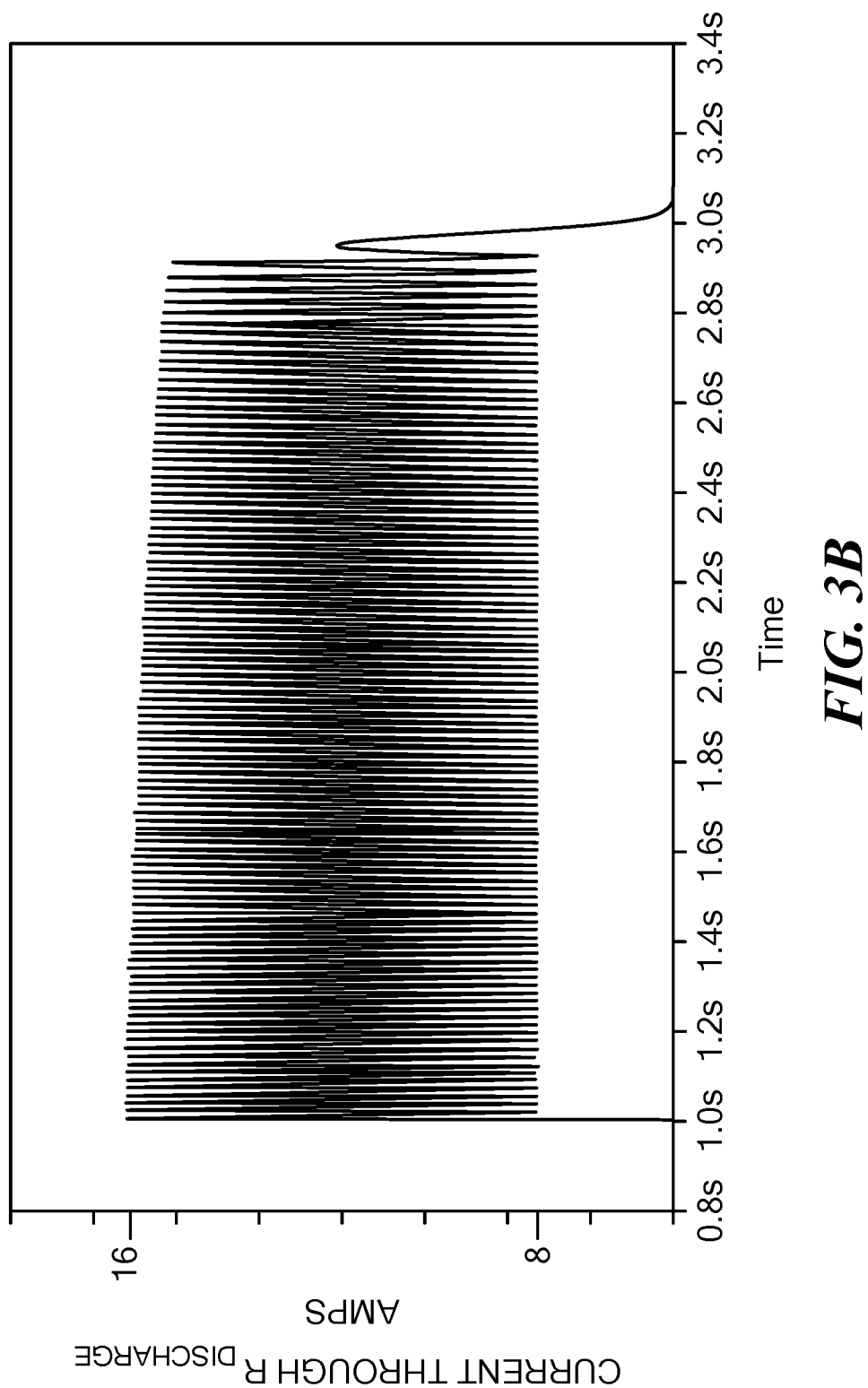
FIG. 3B is a timing diagram of discharge current through a discharge resistor $R_{DISCHARGE}$ used in the system of FIG. 1 during the entire operation of the capacitor discharge circuit of FIG. 1.
Figure 3E:
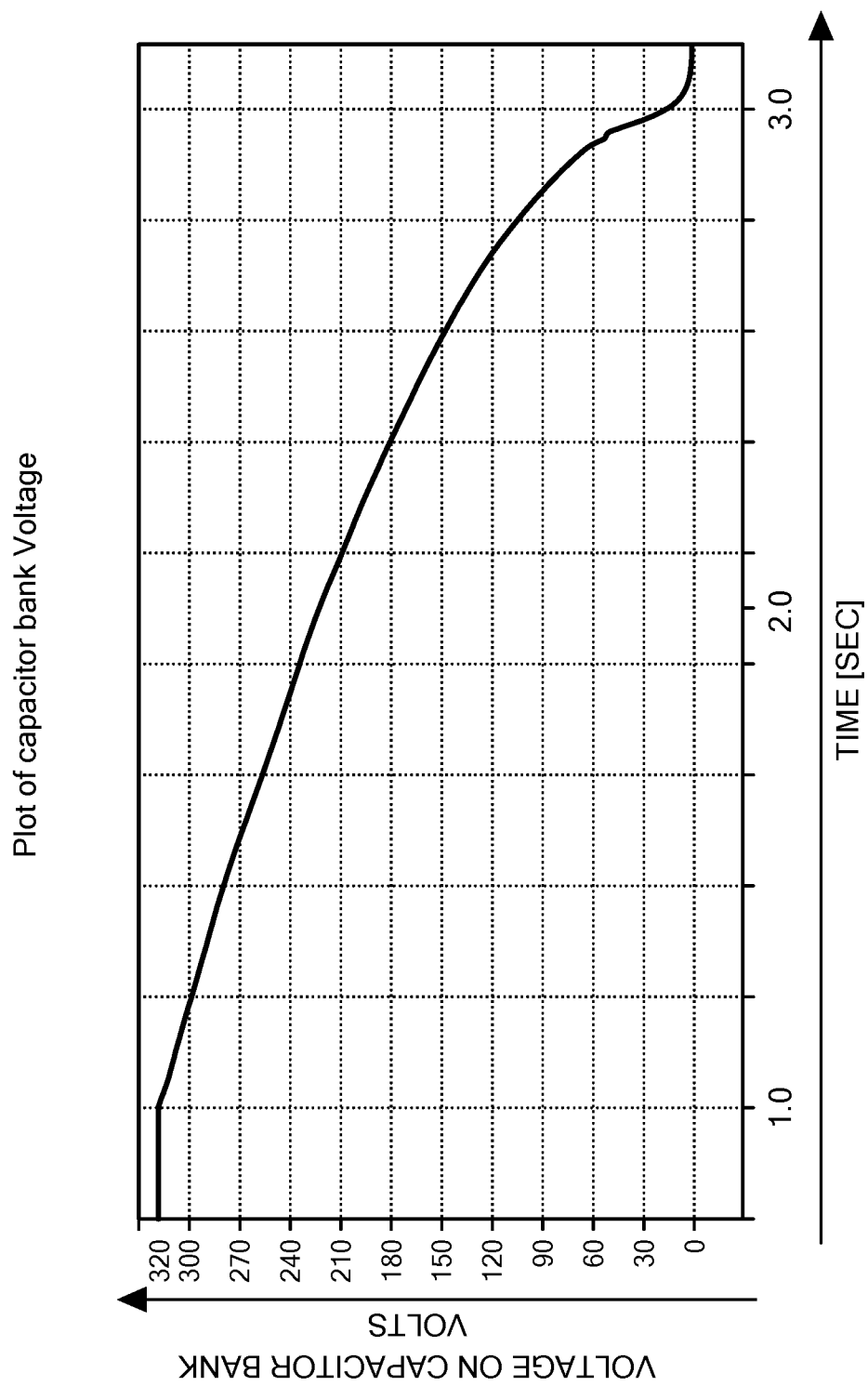
FIG. 3E is a timing diagram of a voltage on the capacitor bank being discharged in the system of FIG. 1 during the entire operation of the capacitor discharge circuit of FIG. 1, Like reference symbols in the various drawings indicate like elements.

The operation is summarized in the flowchart of FIG. 2. As noted above, the voltage on the capacitor bank 12 (FIG. 1) decreases in level after each one of the two-phase discharge cycles and when the level of the voltage on the capacitor bank 12 ceases to be at a level sufficient to produce a current having a level I1, the FET 24 remains in the conducting condition and the capacitor bank 12 continues to discharge through the discharge load 14 until all charge is removed from the capacitor bank 12, as shown by the timing diagrams in FIGS. 3 and 4.

Thus, it is noted that a constant discharge is achieved by turning the FET 24 "on" (in a conducting condition) when the current through the inductor 14 reaches the lower peak and turning the FET 24 "off" (in a non-conducting condition) when the current reaches the high peak. That switching of the FET 24 "on" and "off" creates a triangular waveform of current through the inductor and discharge resistor (FIGS. 3A-3E), which results in a constant (average) power dissipation in the discharge load 14.

Thus, referring again to FIGS. 3A-3E, to begin the high voltage capacitor discharge at time $T_0$, a discharge command is applied from the system 18 to the Discharge Circuit Controller 28. The discharge command signal is the inverse of the system power supply 13 enable signal, so that the System High Voltage Power Supply 13 is disabled at the same time that the discharge circuit 11 is enabled. This prevents an active discharge while the System High Voltage Power Supply 13 is still operating. The Discharge Circuit Controller 28 turns on the discharge FET 24, $Q_{SWITCH}$, by applying a voltage to the gate G. The voltage on the high voltage capacitor bank 12 $C_{BANK}$, causes a current through the discharge load 14 $R_{DISCHARGE}$, the discharge inductor $L_{DISCHARGE}$, the discharge FET 24 $Q_{SWITCH}$, and current sense resistor $R_{SENSE}$ to begin to increase as it passes to the ground of the circuit. When the current sense voltage $V_{SENSE}$ created by the discharge current $I_{DISCHARGE}$ times $R_{SENSE}$ reaches a reference voltage $V_{REF1}$, then the comparator circuit 34 is tripped and FET 24 $Q_{SWITCH}$ is turned off by the Discharge Circuit Controller 28 at time $T_1$. Here, for example $R_{SENSE}$ is 0.08 Ohms. This occurs when the discharge current $I_{DISCHARGE}$ reaches $I_1$. The current $I_{DISCHARGE}$ through $R_{DISCHARGE}$ and $L_{DISCHARGE}$ then begins to conduct through the freewheeling, fly-back diode 23 $CR_{DISCHARGE}$. The current $I_{DISCHARGE}$ decays at a rate proportional to the time constant $L_{DISCHARGE}/R_{DISCHARGE}$. The timing circuit 40, here an R-C circuit with a time constant that matches the $L_{DISCHARGE}/R_{DISCHARGE}$ time constant samples the voltage $V_{SENSE}$ at time $T_1$. Here, $V_{SENSE}$ changes based on the current through $R_{SENSE}$ and here $V_{SENSE}$ peaks at, in this example, 1.4 Volts. When the voltage of the RC circuit timing circuit 40 decays to the trip threshold $V_{REF2}$, FET 24 $Q_{SWITCH}$ is turned on (time $T_2$ with $I_{DISCHARGE}$ at $I_2$), and the cycle repeats with the current $I_{DISCHARGE}$ once again passing through $Q_{SWITCH}$ and $R_{SENSE}$, and increasing until it reaches the current level $I_1$ again. Note that the voltage $V_{CAP}$ on the capacitor bank $C_{BANK}$ decreases each cycle during the time that FET $Q_{SWITCH}$ is turned on (e.g. time periods $T_0$ to $T_1$ and $T_2$ to $T_3$). Because of this, the time it takes for the current $I_{DISCHARGE}$ to ramp up to the $Q_{SWITCH}$ turn off threshold $I_1$ each cycle is slightly longer than the previous cycle by the relationship $I_{DISCHARGE} = (V_{CAP}/R_{DISCHARGE})*(1-\exp(-R_{DISCHARGE}*t/L_{DISCHARGE}))$, where t is time. This means that the frequency of operation of the circuit decreases slightly as the voltage $V_{CAP}$ decays.

In the fashion described above an average current is created through resistor $R_{DISCHARGE}$ and inductor $L_{DISCHARGE}$, and thereby an average power is dissipated in discharge load 14 $R_{DISCHARGE}$ by the square of $I_{DISCHARGE}$ times $R_{DISCHARGE}$. It is also noted that the high current level ($I_1$) decreases slightly each switching cycle because the voltage on the capacitor bank 12 has decreased slightly from the cycle before. This means that the current increases at a slightly lower rate than the previous cycle. There is a little bit of overshoot on the current each time because current is still flowing through the FET 24 switch as it is being turned "off". The higher voltage on the capacitor bank 12 at the beginning of the discharge makes the current overshoot a little bit more than at the end of the discharge, when the voltage on the capacitor bank 12 is lower. The low switching current ($I_2$) changes a little bit on the bottom side. However, since a lower peak current was reached, the decay in absolute terms of amps is slightly slower at the end of the discharge than at the beginning, so the change in the lower current level ($I_2$) is less pronounced that the higher current level (I1). As noted above, the discharge cycles continue until the voltage on $C_{BANK}$ 12 is insufficient to cause the current through $R_{SENSE}$ to reach the level of $I_1$. This means that the FET $Q_{SWITCH}$ remains turned "on", and the current $I_{DISCHARGE}$ decays to zero at which time the voltage on capacitor $C_{BANK}$ also reaches zero. This completes the discharge of the high voltage capacitor $C_{BANK}$.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A capacitor discharge circuit, comprising:
a capacitor comprising a first plate and a second plate, and configured to store an electric charge, the capacitor having a capacitor voltage that is nonzero volts; and
discharge circuitry configured to discharge the electric charge so that the capacitor voltage becomes zero volts, the discharge circuitry being connected to the first plate, the discharge circuitry comprising:
a switch having a first terminal and a second terminal;
an inductor;
a discharge load having a resistor in series with the inductor, wherein one of the resistor or the inductor is connected to the first plate of the capacitor, wherein the other one of the resistor or the inductor is connected to the first terminal of the switch;
a controller configured to provide, in response to a control signal, a discharge signal to the switch to enable electrically coupling the discharge load to the second plate of the capacitor; and
current level sensing circuitry connected to the second terminal of the switch, wherein the current level sensing circuit is configured to provide the control signal to the controller in response to a current from the capacitor passing to the discharge load,
wherein the switch is electrically in series with both the current level sensing circuitry and the capacitor, and the switch is electrically connected between the current level sensing circuitry and the capacitor, and
wherein the discharge circuitry is configured, in response to the control signal, to modulate a level of the current passing from the capacitor to the discharge load over time between predetermined ranges of current levels by opening and closing of the switch.

2. The capacitor discharge circuit recited in claim 1 wherein the capacitor, the discharge load, and the switch are connected electrically in series, and
wherein the discharge load is electrically connected between the capacitor and the switch.

3. The capacitor discharge circuit recited in claim 1 wherein the switch is a transistor,
wherein the first terminal of the switch is one of a drain or a source, and
wherein the second terminal is the other one of the drain or the source.

4. The capacitor discharge circuit recited in claim 1 wherein the discharge circuitry further comprises a diode connected to the first plate and the first terminal of the switch, and
wherein the diode is electrically connected in parallel with the resistor and the inductor.

5. A capacitor discharge circuit of claim 1, wherein a voltage potential applied in the inductor minimizes instantaneous power across the resistor in the discharge load,
wherein during discharge of the electrical charge from the capacitor, no voltage is applied to the capacitor, and
wherein the capacitor having a capacitor voltage that is nonzero volts comprises the capacitor having the capacitor voltage that is greater than 30 volts.

6. A capacitor discharge circuit, comprising:
a capacitor comprising a first plate and a second plate, and configured to store an electric charge, the capacitor having a capacitor voltage that is nonzero volts; and
discharge circuitry configured to discharge the electric charge so that the capacitor voltage becomes zero volts, the discharge circuitry being connected to the first plate, the discharge circuitry comprising:
a switch comprising a first terminal and a second terminal;
current level sensing circuitry connected to the second terminal of the switch;
an inductor; and
a discharge load having a resistor electrically in series with the inductor, wherein one of the resistor or the inductor is connected to the first plate of the capacitor, wherein the other one of the resistor or the inductor is connected to the first terminal of the switch,
wherein the current level sensing circuitry configured to produce a control signal in response to current passing to the discharge load,
wherein the discharge circuitry, for discharging the capacitor to the discharge load over a plurality of discharge cycles, with current from the capacitor passing through the discharge load with increasing level over time during one portion of each one of the discharge cycles and with current passing through the discharge load decreasing in level over time during a different portion of each one of the discharge cycles in response to the control signal, and
wherein the switch is electrically in series with both the current level sensing circuitry and the capacitor, and the switch is electrically connected between the current level sensing circuitry and the capacitor.

7. The capacitor discharge circuit recited in claim 6 wherein:
during said one portion of each one of the discharge cycles, the inductor stores a portion of energy discharged from the capacitor while a different portion of the energy discharged is dissipated in the discharge load; and
during said different portion of each one of the discharge cycles the portion of the energy stored in the inductor is dissipated in the discharge load.

8. The capacitor discharge circuit recited in claim 7 wherein the discharge circuitry further comprises:
a controller configured to initiate switching from said one portion of each one of the discharge cycles to said different one of the discharge cycles when the level of the sensed current passing through a predetermined current level,
wherein the current level sensing circuit is configured to provide a control signal to the controller in response to a current from the capacitor passing to the discharge load.

9. The capacitor discharge circuit recited in claim 8 wherein the discharge circuitry includes timing circuitry for switching from said one portion of each one of the discharge cycles to said different one of each one of the discharge cycles a predetermined period of time after the initiating switching from said one portion of each one of the discharge cycles to said different one of the discharge cycles.

10. The capacitor discharge circuit recited in claim 9 wherein the current level sensing circuitry produces a voltage level varying in accordance with the level of current passing through the discharge load during said one portion of each one of the discharge cycles and wherein the discharge circuitry comprises
a voltage sampler, responsive to current level sensing circuitry, for storing a sample of the level of the produced voltage level when such produced voltage level reaches a predetermined voltage level;
a resistor-capacitor network fed by the sampler, the capacitor of the resistor-capacitor network storing the sample of the produced voltage level and then discharging the stored voltage through the resistor of such resistor-capacitor network; and
circuitry for initiating said different portion of each one of the discharge cycles when the voltage discharges to a second predetermined voltage level.

11. The capacitor discharge circuit recited in claim 6 wherein the discharge circuitry further comprises a diode connected to the first plate and the first terminal of the switch, and
wherein the diode is electrically connected in parallel with the resistor and the inductor.

12. The capacitor discharge circuit recited in claim 6 wherein the capacitor, the discharge load, and the switch are connected electrically in series, and
wherein the discharge load is electrically connected between the capacitor and the switch.

13. The capacitor discharge circuit recited in claim 6 wherein the switch is a transistor,
wherein the first terminal of the switch is one of a drain or a source,
wherein the second terminal is the other one of the drain or the source, and
wherein a discharge signal generated by the controller enables a gate of the transistor.

14. A capacitor discharge circuit of claim 6, wherein a voltage potential applied in the inductor minimizes instantaneous power across the resistor in the discharge load,
during discharge of the electrical charge from the capacitor, no voltage is applied to the capacitor, and
wherein the capacitor having a capacitor voltage that is nonzero volts comprises the capacitor having the capacitor voltage that is greater than 30 volts.

15. A capacitor discharge circuit, comprising:
a capacitor comprising a first plate and a second plate, the capacitor configured to store an electric charge, the capacitor having a capacitor voltage that is greater than 30 volts;
discharge circuitry configured to discharge the electric charge so that the capacitor voltage becomes zero volts, the discharge circuitry being connected to the first plate, comprising:
a switch comprising a first terminal and a second terminal;
a discharge section having a first terminal connected to the first plate and a second terminal connected to the first terminal of the switch, the discharge section comprising:
an inductor;
discharge load having a resistor in series with the inductor;
a diode connected in parallel with the discharge load; and
current level sensing circuitry;
wherein the switch is electrically in series with both the current level sensing circuitry and the capacitor, and the switch is electrically connected between the current level sensing circuitry and the capacitor; and,
a controller configured to provide, in response to a control signal, a discharge signal to the switch to enable the electric charge to become discharged from the capacitor and dissipated in the discharge load,
wherein, in response to the control signal, a first one of a plurality of discharge cycles is initiated and wherein:
during discharge of the electrical charge from the capacitor, no voltage is applied to the capacitor;
during a first phase of the plurality of discharge cycles:
the switch is closed electrically coupling the discharge section to the second plate with current passing from the first plate through discharge load, through the inductor, through the closed switch and through the current level sensing circuitry with such current producing a voltage to reverse bias the diode, a portion of energy in such current being dissipated in the discharge load and another portion of such energy such current being stored in a magnetic field of the inductor until the current reaches a predetermined level sensed by the current level sensing circuitry to initiate a second phase of the plurality of discharge cycles; and
during a second phase of the plurality of discharge cycle:
the switch is open electrically interrupting current from passing from the first plate through the inductor with such interrupted current resulting in the inductor producing a voltage to forward bias the diode and enable the energy stored in the magnetic field of the inductor to pass to the discharge load and dissipate in the discharge load and, subsequent to such discharge, initiate a subsequent one of the plurality of discharge cycles.

16. The capacitor discharge circuit recited in claim 15 wherein the current level sensing circuit is configured to provide the control signal to the controller in response to a current from the capacitor passing to the discharge load.

17. The capacitor discharge circuit recited in claim 15 wherein the capacitor, the discharge section, and the switch are connected electrically in series,
   wherein the discharge section is electrically connected between the capacitor and the switch.

18. The capacitor discharge circuit recited in claim 17 wherein the switch is a transistor, and
   wherein the discharge signal enables a gate of the transistor.

19. The capacitor discharge circuit recited in claim 15 wherein the switch is a transistor,
   wherein the first terminal of the switch is one of a drain or a source,
   wherein the second terminal is the other one of the drain or the source, and
   wherein the discharge signal enables a gate of the transistor.

20. The capacitor discharge circuit recited in claim 15 wherein the controller is enabled by a discharge command signal.

* * * * *